United States Patent
Cox et al.

(10) Patent No.: US 7,504,945 B2
(45) Date of Patent: Mar. 17, 2009

(54) METHOD AND SYSTEM FOR TRACKING AND MONITORING STATUS OF DATA STORAGE SUBSYSTEM COMPONENTS

(75) Inventors: Aaron R. Cox, Tucson, AZ (US); Richard V. Kisley, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 11/015,380

(22) Filed: Dec. 17, 2004

(65) Prior Publication Data

US 2006/0132310 A1    Jun. 22, 2006

(51) Int. Cl.
  *G08B 13/14* (2006.01)
(52) U.S. Cl. ............... 340/572.1; 340/505; 340/539.1; 340/539.13; 340/691.1; 340/691.6; 340/3.3; 340/3.31; 340/10.1
(58) Field of Classification Search ............. 340/505, 340/539.1, 539.13, 572.1, 691.1, 691.6, 3.3, 340/3.31, 10.1
See application file for complete search history.

(56) References Cited

U.S. PATENT DOCUMENTS

| | | | |
|---|---|---|---|
| 5,949,335 A | 9/1999 | Maynard | 340/572.1 |
| 5,959,568 A * | 9/1999 | Woolley | 342/42 |
| 6,025,780 A | 2/2000 | Bowers et al. | 340/572.3 |
| 6,177,860 B1 | 1/2001 | Cromer et al. | 340/10.1 |
| 6,346,881 B1 | 2/2002 | Davidson | 340/514 |
| 6,404,339 B1 | 6/2002 | Eberhardt | 340/572.1 |
| 6,480,100 B1 | 11/2002 | Frieden et al. | 340/10.1 |
| 2001/0000019 A1 | 3/2001 | Bowers et al. | 340/572.1 |
| 2002/0008140 A1 | 1/2002 | Reynolds et al. | 235/385 |
| 2002/0032502 A1 | 3/2002 | Russell | 700/214 |
| 2002/0167406 A1 | 11/2002 | Garber et al. | 340/572.7 |
| 2002/0194208 A1 | 12/2002 | Knoll et al. | 707/204 |
| 2003/0097304 A1 | 5/2003 | Hunt | 705/22 |
| 2004/0008123 A1 | 1/2004 | Carrender et al. | 340/825.49 |

FOREIGN PATENT DOCUMENTS

JP    2002065418    3/2002

* cited by examiner

*Primary Examiner*—Daryl C Pope
(74) *Attorney, Agent, or Firm*—Dale F. Regelman; Quarles & Brady LLP

(57) ABSTRACT

Components in a data storage subsystem are tracked, and their status monitored, with the use of memory devices such as RFID tags. In the practice of the invention, a component of a data storage subsystem, such as a data recording device, is associated with a memory device, such as but not limited to a Radio Frequency Identification (RFID) tag, that is capable of storing information regarding the data storage component and configured to transmit such information upon interrogation by a reader device. The memory device is coupled to an indicator device that is configured to selectively indicate information about the data storage component.

32 Claims, 7 Drawing Sheets

METHOD AND SYSTEM FOR TRACKING AND MONITORING STATUS OF DATA STORAGE SUBSYSTEM COMPONENTS

FIELD OF THE INVENTION

This invention relates generally to the tagging of data storage devices and other data storage subsystem components for purposes of tracking such data storage assets and gathering and displaying information regarding such assets, and in particular relates to a radio frequency identification (RFID) tagging system for data storage subsystem components and subcomponents.

BACKGROUND OF THE INVENTION

Data storage subsystems, such as the IBM TotalStorage Enterprise Storage Server® subsystem[1], contain many types of components and subcomponents such as I/O controllers, power system controllers, RAID controllers, host bus adapters, device bus adapters, and data storage devices. In particular regard to data storage device components, it is common practice in the IT industry to implement a plurality of data storage devices in a single data storage subsystem, such as within a single enclosure. For example, the IBM TotalStorage Enterprise Storage Server Model 800 subsystem contains a plurality of data storage devices, namely hard disk drives, ranging in number from the single digits (e.g., eight in a particular configuration) up to thousands of such devices, with the number of such devices being dependent upon the particular configuration of the subsystem. Another example of a data storage subsystem is the IBM TotalStorage Enterprise Tape Library Virtual Tape Server, which is an automated data storage library that contains up to twelve data storage devices, namely magnetic tape drives. Data storage devices, as that term is employed herein, refers to any device that has the capability of reading and/or writing data onto media, and in addition to hard disk drives and magnetic tape drives, also includes, but is not limited to, optical disk drives, including DVD and CD-ROM drives, as well as any solid state storage devices. Such data storage devices may also be used as standalone systems in addition to being used as components of data storage subsystems.

Data storage devices are typically sold contained in carriers, such as "Hard Drive Carriers" or "HDCs" in the particular case of hard disk drives. Typically, a data storage device is identified only by a serial number or the like. In the particular case of an HDC, the serial number information is typically placed on a label that is then placed on, or attached to, the HDC. The serial number is often printed on the label in the form of a bar code.

The tracking of HDCs so labeled is typically done, if tracked at all, by manually tracking such HDCs using a bar code reader to read the serial number. A manual tracking system would necessarily include a database, as implemented and maintained by the user, that contains particular information associated with a device having a particular bar code. Some examples of the types of information as may be contained on such a database might be location of the particular HDC within a data storage subsystem, year of manufacture of the hard disk drive, service and maintenance information regarding the hard disk drive, and such other information as might be useful in regard to a particular data storage device.

Regardless of whether a data storage device is used in a standalone capacity or as a component of a data storage subsystem, such devices can be difficult to track, even with a properly implemented and maintained manual tracking system as described above. For example, if an HDC has been removed from a slot in an enclosure associated with an IBM TotalStorage Enterprise Storage Server data storage subsystem, such as may contain hundreds or even thousands of such HDCs as described above, and if the user of the subsystem had a manual bar code tracking system, the user would most likely refer to the database for the particular serial number indicated on the removed HDC to access information regarding its slot location and regarding its status, i.e., whether the particular HDC contains a working hard disk drive. Without a manual tracking system, a user might necessarily resort to attempting insertion of the HDC into available empty slots in the enclosure with the hope that the subsystem controller would eventually recognize and re-assimilate the data storage device into the operation of the subsystem.

Typically, data stored in a data storage subsystem or in a standalone data storage device, once requested, is needed quickly. It is desirable that a data storage subsystem or standalone device be maintained in an operational condition as much as possible, such as the well known, and universal, goal of "24×7×365" availability. Therefore, in the event of the need for service or maintenance with regard to data storage devices, it is desirable that information regarding such devices be made available to the user or the service provider, as applicable, as quickly and reliably as possible, and in any event, more quickly and reliably, for example, than might be available via the multi-step process of reading the barcoded serial number; recording the serial number by hand onto paper; accessing a centralized database (which may or may not be accurate or updated); and then cross referencing the centralized database using the hand-written serial number to obtain information regarding the device as may be contained on the database.

A need remains for a means to track components and subcomponents of data storage subsystems and to gather and display information regarding such data storage assets in an improved, more efficient manner.

SUMMARY OF THE INVENTION

The long-felt need of the prior art for tracking data storage assets, such as components and subcomponents of data storage subsystems, and gathering and displaying information regarding such assets, is satisfied by the present invention. In accordance with the invention, disclosed is a data storage subsystem that has at least one data storage component, with the data storage component being associated with a memory device, such as but not limited to a Radio Frequency Identification (RFID) tag, that is capable of storing information regarding the data storage component and configured to transmit such information upon interrogation. The memory device is coupled to an indicator device that is configured to selectively indicate information about the data storage component.

Also claimed is a method for enabling the tracking and displaying of information regarding components of a data storage subsystem. The recited method involves the steps of providing a memory device that is capable of storing information regarding the data storage component and configured to transmit such information upon interrogation; affixing the memory device to at least one data storage component in the subsystem; coupling the memory device to an indicator device; and enabling the indicator device to selectively indicate the information.

Also claimed is a method for obtaining information regarding components in a data storage subsystem that has a plurality of data storage components, with substantially each data storage component having an associated memory device that is coupled to an indicator device configured to selectively indicate information stored on the memory device regarding the data storage component. The recited method involves the steps of providing a reader device capable of interrogating the memory devices; sending, via said reader device, an interrogation substantially simultaneously to each memory device associated with a data storage component in the subsystem; and observing the indicator devices that are coupled to the memory devices to ascertain information regarding the associated data storage components.

Data storage assets that might benefit from the practice of the invention include, but are in no way limited to, components and subcomponents of data storage subsystems such as the IBM TotalStorage Enterprise Storage Server® data storage subsystem and the IBM TotalStorage Enterprise Tape Library Virtual Tape Server. Data storage components that might benefit from the practice of the invention include, but are in no way limited to, data storage devices (such as hard disk drives, floppy disk drives, magnetic tape drives, optical disk drives such as DVD drives, solid state disk drives and the like), processors, servers, memory modules, power supplies, battery backup units and the like. Subcomponents of data storage subsystems include but are not limited to, miniature disk drives such as the current 0.8" and 1" technology drives, daughter and mezzanine cards, Memory DIMMs and a myriad of solid state memory cards available today such as those used in digital cameras, cellular phones and PDAs (personal digital assistants).

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numerals represent the same or similar elements. While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

The invention will be described as embodied in regard to a hard disk drive as an exemplary data storage subsystem component with which the invention might be practiced. Although the invention shown uses hard disk drives, one skilled in the art will recognize the invention equally applies to other types of data recording devices (such as but not limited to floppy disk drives, magnetic tape drives, optical disk drives such as DVD drives, solid state disk drives and the like) and also to other types of data storage subsystem components (such as but not limited to processors, servers, memory modules, power supplies, battery backup units, and the like). The description of data storage subsystem component is not meant to limit the invention to the aforementioned types of components, but rather it is contemplated that the invention can be implemented in regard to any discrete part or component that resides within a data storage subsystem. For example, the invention can be applied to subcomponents of data storage subsystems, including but not limited to miniature disk drives such as the current 0.8" and 1" technology drives, daughter and mezzanine cards, Memory DIMMs and a myriad of solid state memory cards available today such as those used in digital cameras, cellular phones and PDAs (personal digital assistants).

Thus, while a preferred embodiment of the invention will be illustrated and described with respect to hard disk drives, it is to be understood that the invention will have broader applications.

Figure 1:
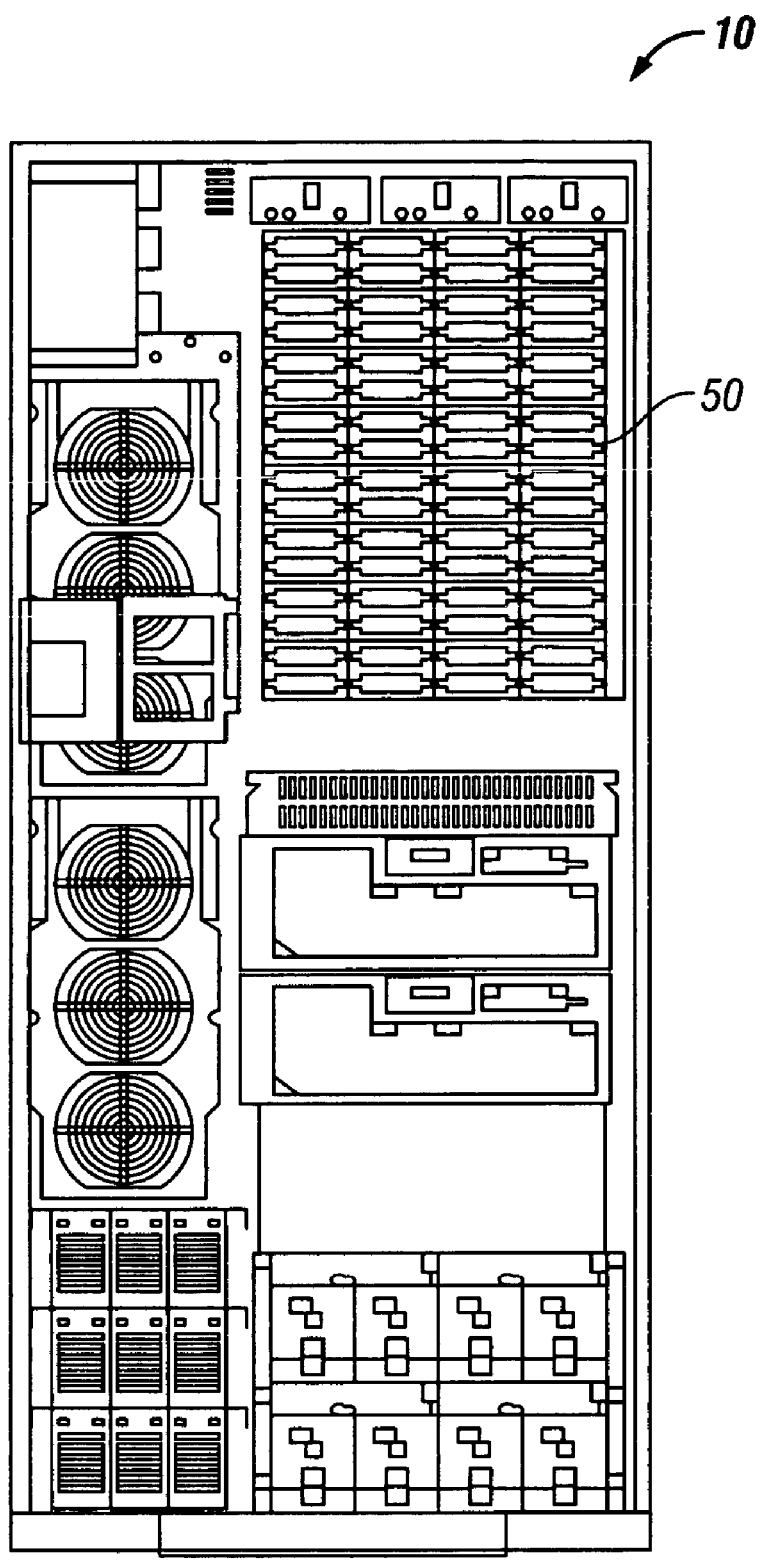
FIG. 1 is an isometric view of a data storage subsystem that contains data storage subsystem components that are adaptable to implement an embodiment of the present invention.
Figure 2A:
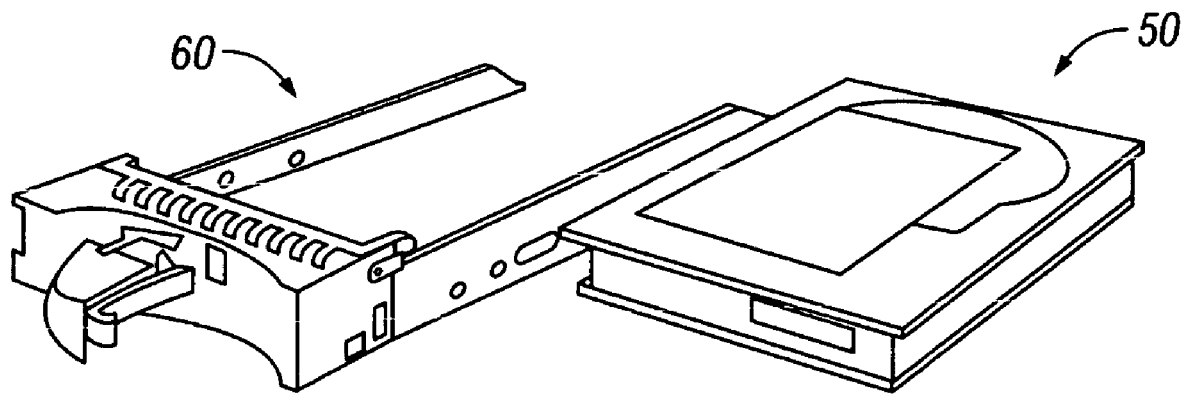
FIG. 2A is an isometric view of a data storage subsystem component, in particular a hard disk drive, and an associated hard disk drive carrier, in an unassembled state.
Figure 2B:
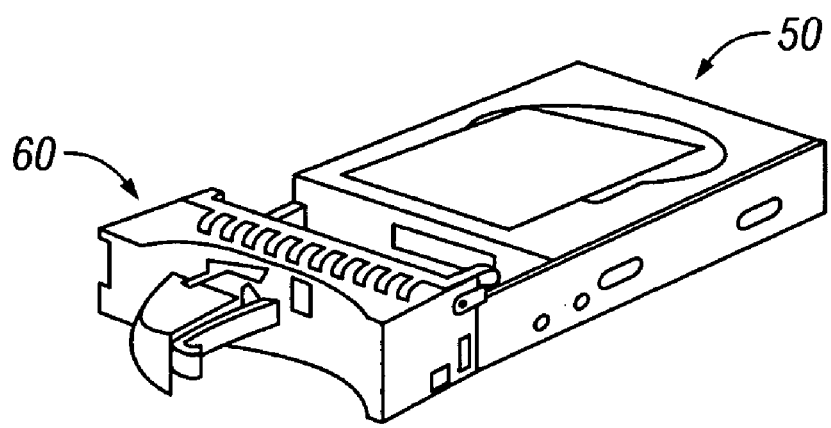
FIG. 2B is an isometric view of a hard disk drive in its associated hard disk drive carrier as might be contained within a data storage subsystem pictured in FIG. 1 and as would be adaptable to implement an embodiment of the present invention.

Turning now to the Figures, FIG. 1 illustrates a data storage subsystem 10, and in particular is an illustration of an IBM TotalStorage Enterprise Storage Server Model 800 data storage subsystem. This exemplary data storage subsystem 10 contains a plurality of hard disk drives 50, as one of the types of components in the subsystem 10 that can benefit from the practice of the invention. An exemplary hard disk drive 50 is depicted in FIG. 2A alongside its carrier 60. FIG. 2B illustrates the hard disk drive 50 as assembled inside associated carrier 60.

In the practice of the invention, a memory device is placed in association with a data storage subsystem component, such as a hard disk drive 50 as contained and implemented within a data storage subsystem 10. The memory device is capable of storing information regarding the data storage subsystem component with which it is associated, and it is configured to transmit such information upon interrogation. In the preferred embodiment of the invention, a radio frequency identification ("RFID") tag serves as the memory device. However, the invention is not so limited to that form of memory device. Other forms of memory devices that may be employed in the practice of the invention are optical tags, which are similar to RFID tags but rely on an optical signal to transmit data to and/or from the tag, and touch memory data carriers, which are also similar to RFID tags but require physical contact to store and retrieve data.

In accordance with the practice of the invention, the data storage subsystem component is associated with a memory device at any time, e.g., either during, after or as an adjunct to assimilation of the component, e.g., hard disk drive 50, into a data storage subsystem 10. Memory devices can be retrofitted to existing data storage subsystem components which are already in the marketplace.

Figure 3:
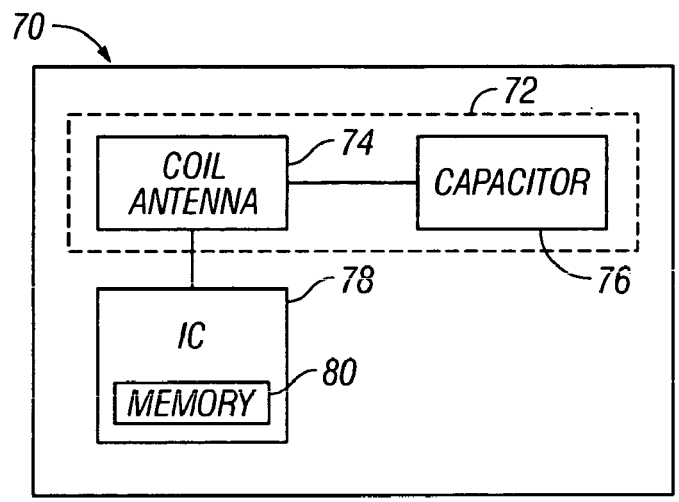
FIG. 3 is a block diagram of a memory device that may be implemented in the practice of the invention.

Referring to FIG. 3, shown is a simplified diagram of an exemplary memory device 70 for tagging and tracking a data storage components in a data storage subsystem 10, such as a hard disk drive 50. The memory device contemplated in the practice of the invention would include a passive resonant radio frequency (RF) circuit 72 for use in detecting when the tag 70 is within a zone monitored by a reader or interrogator, as is well known in the art. An example of a well-known type of resonant circuit 72 for RFID tags has a coil antenna 74 and a capacitor 76 which together form the resonant circuit 72 with a predetermined resonant frequency, i.e., the selected radio frequency deriving from the values represented by the coil 74 and the capacitor 76. Power for the tag 70 can be derived from the antenna 74 as is well known in the art. The tag 70 further includes an integrated circuit (IC) 78 which represents the logic portion of the tag. The IC 78 is electrically connected to the resonant circuit 72. It is noted that the capacitor 76 may be either external to the IC 78 or within the IC 78, depending on the desired implementation of the circuit 72. The IC 78 includes a programmable memory 80 such as a 256 bit Electrically Erasable Programmable Read Only Memory (EEPROM) for storing bits of information, i.e., information regarding the data storage subsystem component with which the RFID tag 70 is associated. Thus, the foregoing describes an exemplary radio frequency identification (RFID) tag, which typically includes a memory 80 for storing data, an antenna 74, an RF transmitter and/or RF receiver 72, and logic 78 for controlling the various components of the memory device.

Figure 4:
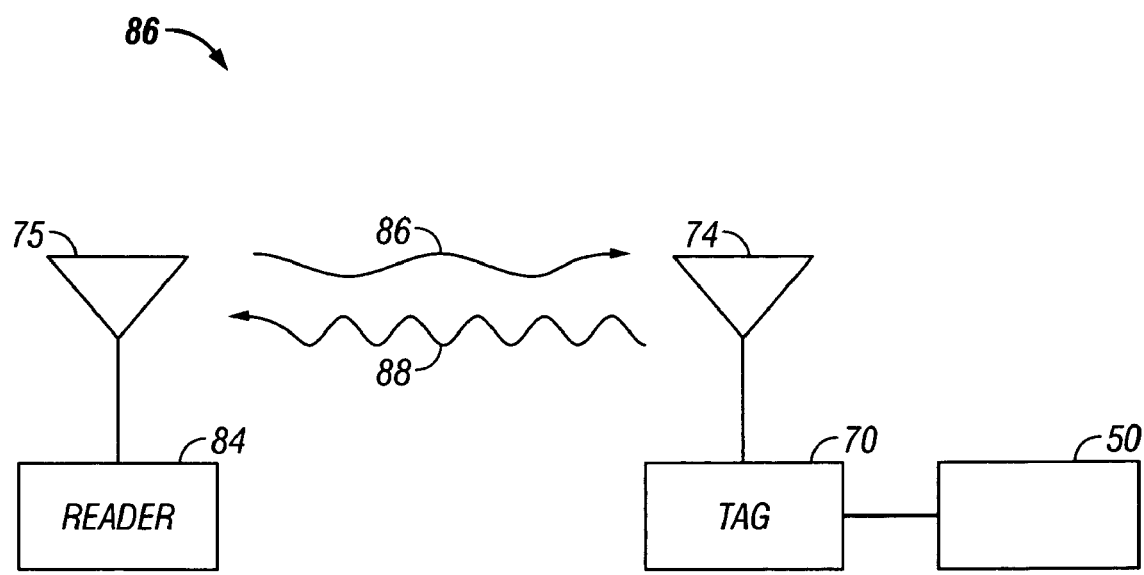
FIG. 4 is a block diagram of a tag and reader that may be employed in the practice of an embodiment of the present invention.

As is well known in the art of such memory devices as RFID tags, a reader 84, (i.e., an RFID reader in the case of RFID technology) is used to interrogate and poll the memory device 70 (i.e., RFID tag in the case of RFID technology) to obtain information stored on the memory device 70 in the memory 80. Turning to FIG. 4, shown therein is a simplified diagram of a system 86 involving a reader 84 and a tag 70, with reader 84 having antenna 75 and tag 70 having antenna 74. The reader 84 is configured to transmit an interrogation signal 86 that is received by the tag 70, which includes an element that is responsive to a radio frequency interrogation signal. The term "responsiveness" means, in the context of the present invention, that the element provides intelligible information when subjected to an appropriate interrogation field. In response thereto, the tag 70 returns a signal 88 containing data or other information stored in the tag 70 in memory 80. Both the tag 70 and the reader 84 of the disclosed embodiments of the invention may be formed using known techniques.

Figure 5:
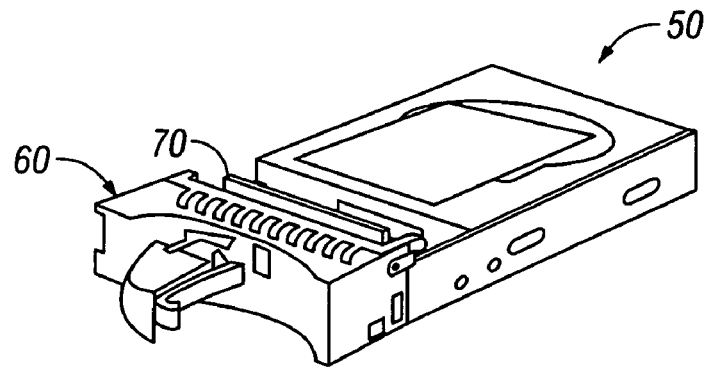
FIG. 5 is an isometric view of a hard disk drive in its associated hard disk drive carrier having an associated memory device as an embodiment in the practice of the invention.

As depicted in FIG. 4, and in the practice of the invention, the memory device 70 is associated with a data storage component, such as but not limited to a hard disk drive 50, and the data or other information stored in memory device 70 regards such associated data storage subsystem component 50. Preferably, the memory device 70 is affixed (mechanically, chemically or otherwise) or otherwise secured to, or in the vicinity of the structure of the device or a structure or packaging associated with the data storage subsystem component, e.g., a carrier 60 for the device such as an HDC. Turning to FIG. 5, a hard disk drive 50 in carrier 60 represents the data storage component, with RFID tag 70 being secured to the carrier 60 via an appropriate adhesive material. As described earlier, it is contemplated that in the practice of the invention, the memory device 70 stores information regarding the device with which it is associated.

The reader 84 is contemplated to typically be a handheld device or fixed mounted device that is battery powered, although the source of power is not limited to batteries. The power source is preferably integral to the reader 84, although the reader 84 can be tethered to a larger power source, i.e., a larger power source of the type that might be worn around a user's waist, or the reader could receive power via an electrical cord plugged into an electrical outlet. Preferably, the reader 84 is a separately powered, hand held device.

Figure 6:
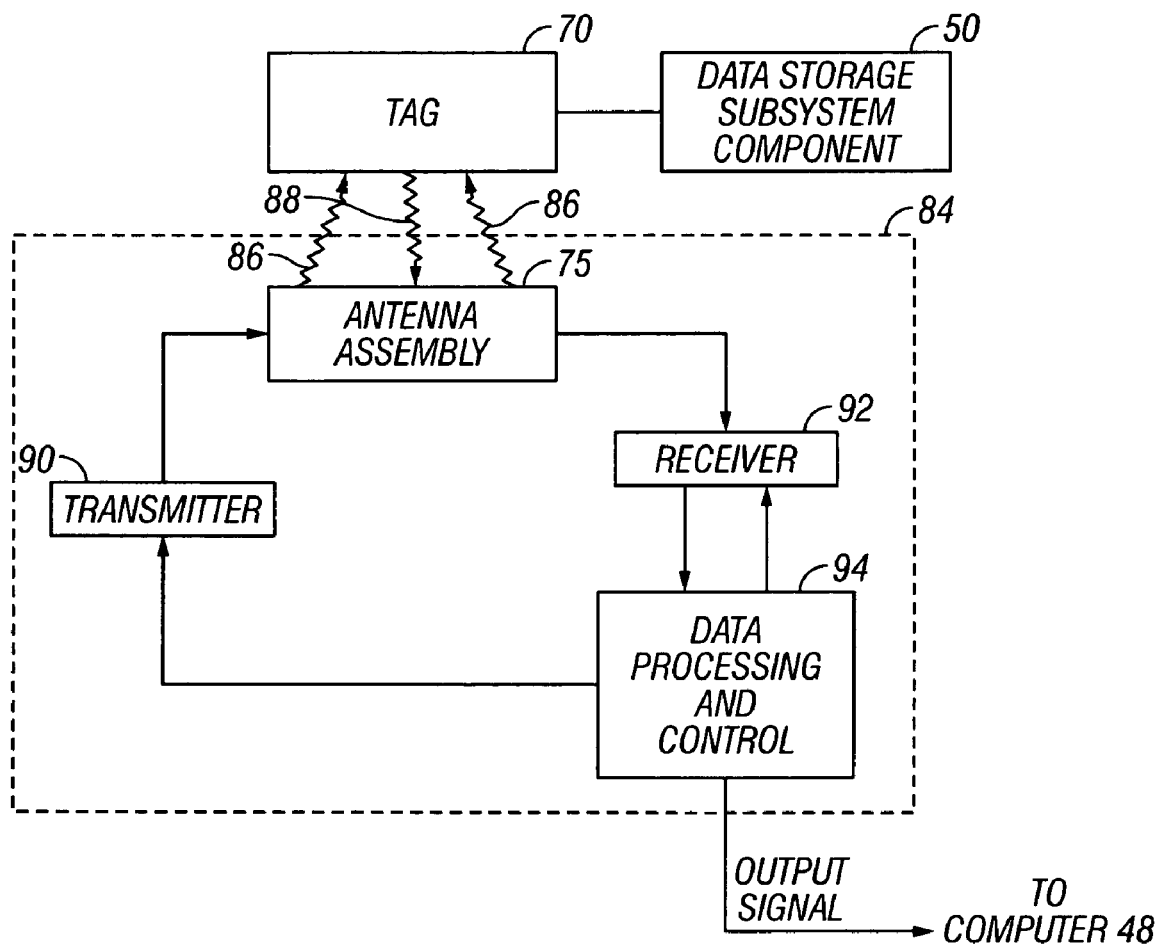
FIG. 6 is a block diagram schematic of a reader for use in reading a tag in one embodiment of the practice of the invention.

Turning to FIG. 6, more detail is presented regarding the reader/interrogator 84 preferably used in the practice of the invention. The handheld RFID reader (also termed "interrogator") 84 of the present invention preferably includes a transmitter 90, a receiver 92, antenna assembly 74, and data processing control circuitry 94. The output of the transmitter 90 is connected to the input of the antenna assembly 75. The output of the antenna assembly 75 is connected to a first input of the receiver 92. A first input and first output of the data processing and control circuitry 94 are connected, respectively, to the first output and second input of receiver 92. The second output of the data processing and control circuitry 94 is connected to the first input of transmitter 90, while the third output is connected to computer 48. It may also contain various feedback systems, including lights, audio and a display. The reader 84 generates the interrogation signal 86 of the proper frequency and range to interact (wirelessly) with the nearby RFID tags 70. Such interrogation signals can be emitted in a range from one inch to one hundred feet or more, as a rough example, depending upon its power input and the radio frequency used. When an RFID tag 70 passes through the interrogation signal 86, the tag 70 detects the signal 86 and is activated, as is well known in the art. Data encoded in the tag 70 in memory 80 is then transmitted through reflection (modulation of the incoming RF signal) by the modulated signal 88 through the antenna 75, through the receiver 92 to the data processing and control 94 for subsequent processing.

Figure 7:
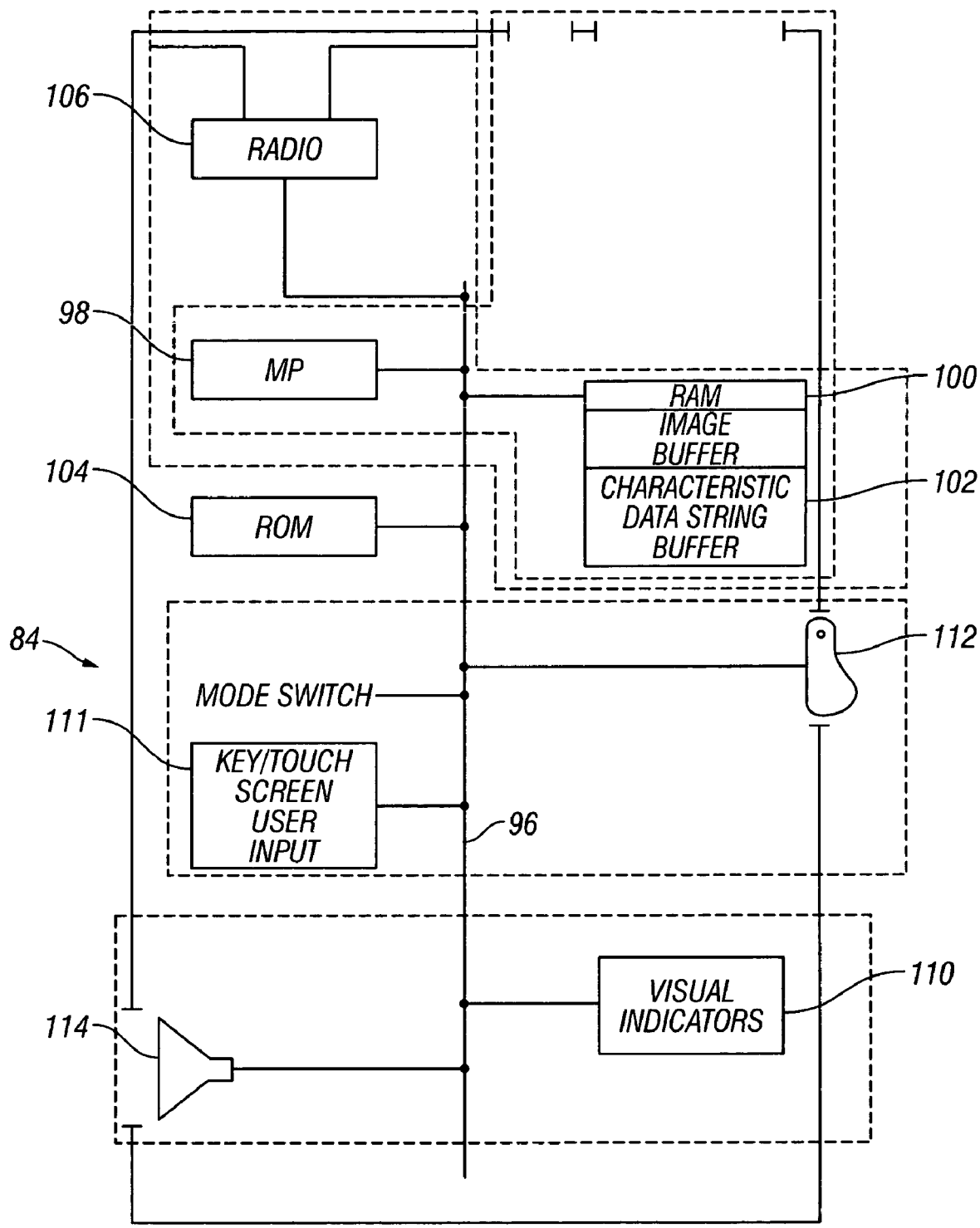
FIG. 7 is a functional block diagram of the reader according to one embodiment of the practice of the invention.

Turning to FIG. 7, an exemplary reader 84 is depicted, although the reader 84 is not limited to the depicted design in the practice of the invention. The depicted exemplary reader 84 includes a microprocessor 98 coupled via bus 96 to a random access memory ("RAM") 100. The RAM 100 can include a characteristic data string buffer 102 to temporarily store characteristic data strings, as will be explained in greater detail below. Alternatively, the reader 84 can include a discrete characteristic data string buffer (not shown). While FIG. 7 shows a single microprocessor 98, the reader 84 may include several separate dedicated processors, e.g., one microprocessor for each type of RFID tag readings.

Continuing with FIG. 7, a read only memory ("ROM") 104 stores instructions for execution by the microprocessor 98 to operate the radio 106. As used herein the ROM 104 includes any nonvolatile memory, including erasable memories such as EEPROMs. The programmed microprocessor 98 can control the radio 106 to emit an interrogation signal 86, including any required polling codes or encryption, and to receive a return signal 88 from an RFID tag 70.

The reader 84 also includes a means for providing user input. The user input device 111 can take the form of a keypad, mouse, touch screen, and/or other user operable device to input information and/or commands to the reader 84. The bus 96 couples the user input device to the microprocessor 98, to allow the user to enter data and commands.

A handheld RFID reader device 84 can interrogate and identify RFID-tagged items whenever it is activated within range of the items. Intermittent activation can be provided by, for example, a trigger 112 associated with the device, so that the elapsed time for which power is required for the RFID device 84 is minimized.

Various modifications of the illustrated reader 84 are known to those of skill in the art including, for example, using separate antennas for the interrogation source 84 and the receiver 92 in place of the single antenna 75 that is illustrated in FIG. 6. It will be appreciated that other forms of modulation such as amplitude modulation (AM), frequency modulation (FM) or phase modulation (PM) may be used to convey the stored tag identification.

An RFID tag can be passive, semi-passive or active, as would be known by a skilled artisan. A passive RFID tag contains no separate power source of its own; an active tag contains its own separate additional power source, typically a battery(ies); and a semi-passive tag is a hybrid of passive and active tags. Typically, a semi-passive tag is partially powered by a separate power source (typically but not limited to a battery), as described above for an active tag, and partially inductively powered, as described above for a passive tag. In any event, the invention is not limited to any particular type of RFID system, i.e., to systems respectively employing passive, active or semi-passive tags, but rather is merely dependent upon the ability of the tag 70 to contain certain information and then to cause the display of such information upon interrogation by a reader 84.

By way of brief description but not limitation, a passive tag is typically read-only because of the power requirements of write activity, for which a passive tag does not have its own power source to meet. A passive tag is typically inductively powered, i.e., from the power generated by the tag's antenna coil 74 in response to the reader's 84 interrogating radio frequency field 86, and uses that energy to transmit response codes 88 by modulating the impedance the antenna 74 presents to the interrogating field, thereby modulating the signal reflected back to the reader antenna 74. The power so generated may be used directly or temporarily stored in a capacitor for later use. Communication using a passive tag where an interrogation signal is modulated and reflected by the passive device is known and will not be described in detail herein. Briefly, backscatter communications involve selectively changing and reflecting the interrogation signal 86 by the tag 70. The tag 70 rectifies the field and dynamically changes the reflective characteristics of the tag antenna 74, creating a change in reflectivity that is seen at the reader 84. The reader 84 receiving the reflected energy is usually the device that has supplied the original energy required for this communication, and the reader 84 is configured to extract the data in the modulated reflected signal 88 by comparing the modulated reflected signal to the original interrogation signal 86. The range of passive tags is more limited than that achievable with active tags.

An active tag's separate power source is typically a battery. While it is contemplated in the practice of this invention that the power source will be separate from that powering the data storage device, the invention is not so limited. In any event, having a separate power source offers several advantages over a passive tag. One advantage of having a separate power source is that it permits active RFID tags 70 to create and transmit strong response signals 88 even in regions where the interrogating radio frequency field is weak, and thus an active RFID tag 70 can be detected at greater range. However, in the practice of the invention, it is not contemplated that the reader 84 and the tag 70 would be separated by any significant range, but rather should occupy the same physical room, e.g., of a building housing a data storage subsystem and its components. In any event, another advantage for an active RFID tag 70 is the availability of sufficient power to offer write capability to the tag. However, the relatively short lifetime of typical batteries available at the time of this invention limits the useful life of the tag 70. Also, a battery adds to the size and cost of the tag.

Those skilled in the art will recognize that any of the foregoing three types of tags, i.e., passive, active or semi-passive, share many common features and that any of the three can be used in the practice of the invention. Some common features of the tag include an integrated circuit 78 and resonant frequency (RF) circuit 72 for use in detecting when the tag 70 is within a zone monitored by a reader/interrogator 84, as is well-known in the art, with the components of the RFID tag being generally formed on a substrate. The integrated circuit provides the "intelligence" to the tag, i.e., the primary identification function. It includes software and circuitry to provide a programmable memory 80 (such as a 64 bit memory) that is capable of permanently storing the tag identification and other desirable information interpret and process commands received from the interrogation hardware, respond to requests for information by the interrogator 84, and assist the hardware in resolving conflicts resulting from multiple tags 70 responding to interrogation simultaneously, the occurrence of which is contemplated in the practice of the invention when a reader 84 interrogates the tags 70 each associated with a data storage component in a data storage subsystem 10. Integrated circuits 78 suitable for use in RFID tags 70 include those available from PolyIC (a German company developing printed electronic circuits and jointly owned by Siemens), Texas Instruments (in their TAG-IT line of products, for example), Motoral/Indala, and Single Chip Systems, among others.

It is noted that the geometry of the antenna 74 and its properties depend on the desired operating frequency of the RFID portion of the tag 70, and such design of the antenna 74 are known by those skilled in the art. Regardless of the specifics of the antenna 74 structure and design, it intercepts the radio frequency energy radiated by an interrogation source 84. This signal energy carries both power and command to the tag 70. The antenna 74 enables the RF-responsive element to absorb energy sufficient, in the case of a passive or semi-passive tag, to power the IC chip 78 and thereby provide the response to be detected. Thus, the characteristics of the antenna 74 must be matched to the system in which it is incorporated, as would be known by one of skill in the art.

A capacitor 76 is often included as an element of the tag 70 in order to increase the performance of the tag 70. A capacitor 76, when present, tunes the operating frequency of the tag 70 to a particular value. This is desirable for obtaining maximum operating range. As is known to those of skill in the art, the capacitor 76 may either be a discrete component of the tag 70 or integrated into the antenna 74. More particularly, as described above, the capacitor 76 may be either external to the IC 78, or the capacitor 76 may be within the IC 78, depending upon the desired implementation of the resonant circuit 72. In addition to the aforementioned components of RFID tags 70, RFID tags can also include a number of other discrete components, such as transistors, diodes, resistors and capacitors.

Of course, other tag designs could also be used with the present invention aside from those described above, and the invention is not limited to the particular tag design described above.

The user interface 111 for the reader 84 is designed both to communicate the status of searching and to allow the user to enter data. Entering data may include switching the device 84 among various search modes and entering data specific to a task. Feedback to the user may be provided through any human-perceptible indicator, namely visual or audio indicators, as is known in the art. More particularly, turning to FIG. 7, the bus 96 couples the visual and audio indicators 110,114 to the microprocessors 98 for control thereby. The visual indicators can take a variety of forms and is not limited to any particular sort of display or signal. Some examples of visual indicators that might be useful in the practice of the invention include, but are not limited to: light emitting diodes ("LEDs", whether uni-color or multi-color); a graphic display such as a liquid crystal display ("LCD"); and/or an alphanumeric display. The audio indicator 114 can take the form of one or more dynamic, electrostatic or peizo-electric speakers. The speaker 114 is operable to produce a variety of sounds (e.g., buzzes, beeps, clicks) and/or frequencies (e.g., tones), and to operate at different volumes is preferably provided though a combination of sound, lights and display. The display may either be integrated into the unit or separated.

In the practice of the invention, the memory device 70 (such as an RFID tag, in the preferred embodiment) is configured to store, or to point to, information regarding the data storage subsystem component 50 (e.g., a hard disk drive) with which it is associated. The information contemplated to be stored regarding the component is not limited to any particular type of information. By way of example but not limitation, the information may include, for the particular data storage subsystem component, the serial number, manufacturer, year of manufacture, capacity, technology, data rate and other information available at the time of manufacture of the data storage device.

It is contemplated that the memory device 70 be used to store certain types of security-related data. Such security-related data is contemplated to be used to prevent operation of the data storage subsystem component 50 unless it is properly connected to the subsystem 10 and can be used to monitor movement of the data storage subsystem component 50 through an interrogation zone of an RFID reader/writer 84, permitting removal of the data storage subsystem component only if authorized, and initiating an alarm indicator if removal is unauthorized.

In general, any asset which can be uniquely identified, usually by a manufacturer's serial number, can be integrated with an RFID tagging system and be a tracked asset within the subsystem 10.

As opposed to passive RFID tags, active RFID tags, which by definition can be updated with post-manufacture information, can contain information including but not limited to location of slot in a data storage subsystem 10 into which the device is placed; inspection, service and repair information; shipping date; etc. Such information may be appended and modified during the life of the component, facilitating tracking the life history of the component. Thus, the tag 70 used in conjunction with the data storage subsystem component may be configured to enable programming of the tag to update the status of its condition. As additional examples, the tag 70 can be programmed by the manufacturer at the time of shipment to a customer with information regarding the manufacturer; delivery of the data storage device; and expected life of the storage device. The customer or service provider may then program the tag 70 or use another tag 70 to store information regarding the location of the data storage subsystem component within a data storage subsystem 10 (e.g., in case the component is moved to a new slot in the subsystem 10); the date of last service of the component; and other useful information regarding the status of the component.

Optionally, the information stored on an active tag 70 can be updated on a database that is either associated with the reader 84 that is located at a remote location and coupled to the reader 84, or both. Such a database can be accessed via the Internet or a local intranet, such as might be found in a customer's computing environment. Readers 84 can be linked to the Internet or intranet, as applicable, and the present condition or status of the data storage subsystem component 50 can accordingly automatically monitored and reported without need for human input.

It is noted that there are a number of options for transferring data between the handheld device 84 and another processing station. A docking station approach can be used to upload or download data. This method could be used, for example, to upload information prior to performing a search to find specific data storage subsystem components 50. Another option would be to download data regarding the data storage subsystem components 50 into the reader 84. The link for the download or upload of information could be implemented as a docking station; as a wireless or cabled download and or upload; as a wireless or cabled, real-time link between the handheld device 84 and another processor, or in any other manner suitable for transferring such data.

Many modern RFID tags 70 also provide significant amounts of user accessible memory, sometimes in the form of read-only memory or write-once memory, but more preferably offering the user the ability to repeatedly update the memory by rewriting its contents remotely, e.g., from the reader 84. The amount of memory can vary, and as such, influences the size and cost of the IC portion 80 of an RFID tag 70. Typically, between 128 bits and 512 bits of total memory can be provided economically at present.

The condition of the tag 70 may also be monitored by using a device that detects a changed condition of the data storage subsystem component 50. This can include, but is not limited to, detecting whether the component has moved, where it is presently located, and other information. The detection of the changed condition can be accomplished in a variety of ways, including physical switches, Doppler radar, and the like.

In one embodiment of the invention, the tag readers 84 and RFID tags 70 used can detect a plurality of data storage subsystem components, such as hard disk drives 50, having tags 70 which are simultaneously passed through or scanned by a reader 84. In most instances, each of the components 50 receive and respond to the interrogation signal at a different instance in time, even when the components, e.g., disk drives 50, are physically close together. The string of returned signals is processed to sort out the individuals IDs. However, if the tags 70 associated with multiple hard disk drives 50, for example, return ID signals at exactly the same instance, the reader 84 can either sort out the returned signal to recover the two distinct IDs or can ignore the simultaneously received signals and use subsequent return signals which are not simultaneously received to sort out the individuals ID's. Even with large numbers of data storage subsystem components, the reader 84 along with memory device 70 on each component, e.g., hard disk drive, can resolve multiple simultaneously received signals. A number of standard algorithms can be used to handle such situations.

Figure 8:
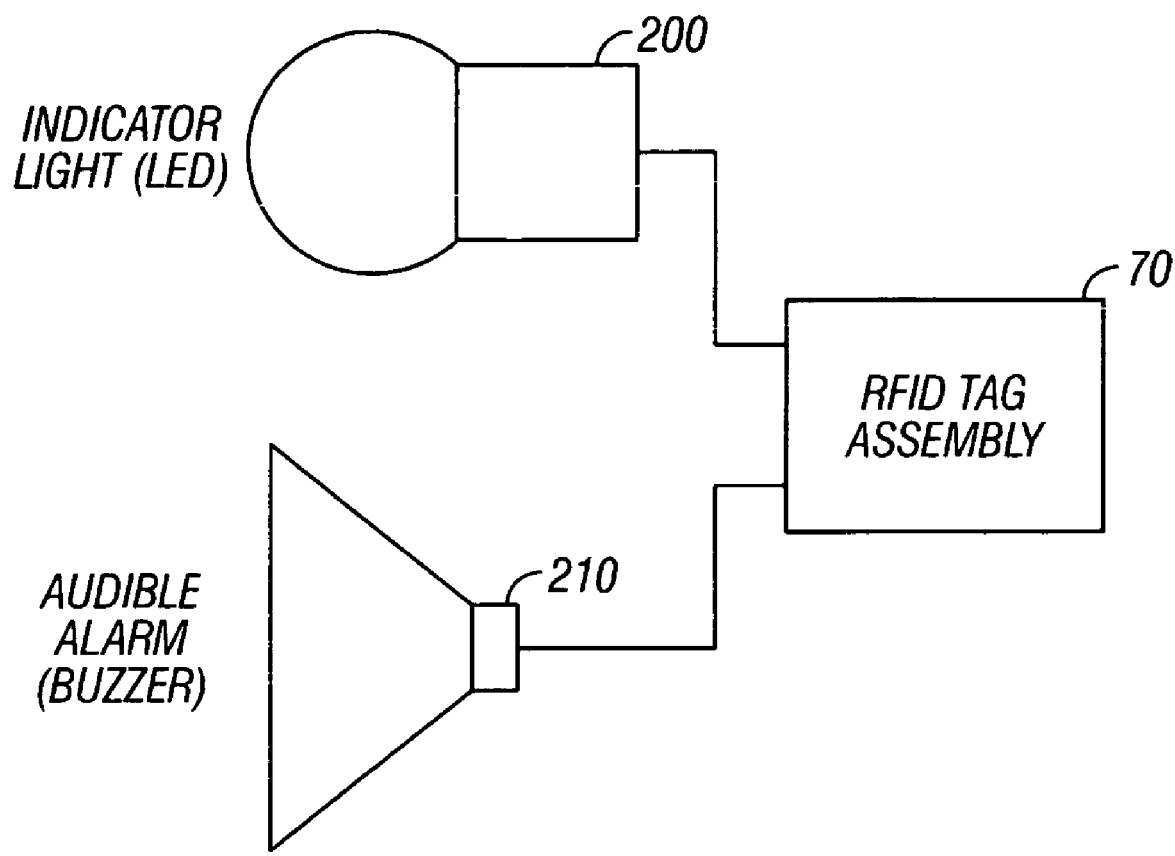
FIG. 8 is a block diagram schematic of an RFID tag connected to an indicator device in one embodiment of the invention.

It is contemplated that, in the preferred embodiment of the practice of the invention, the memory device 70 will, in addition to responding to interrogation signals 86 via signal 88, also indicate a response to a reader 84 inquiry through an indicator device. Turning to FIG. 8, therein is depicted a memory device 70 (in particular, an RFID tag assembly) in connection with a visual indicator 200 as well as with an audible alarm 210. In practice, memory device 70 would transmit the appropriate signals to the associated indicator devices 200 and/or 210 such that the indicator devices for the data storage subsystem component 50 matching the inquiry by the reader 84 would so indicate (via light, audible sound, etc.) The visual indicators 200 could take a variety of forms, for example: light emitting diodes ("LEDs", whether a uni-color LED or multi-color LED, or the like); a graphic display such as a liquid crystal display ("LCD"); and/or an alphanumeric display. The audio indicator 210 could also take many forms, for example, the form of one or more dynamic, electrostatic or peizo-electric speakers. The audio indicator 210 could be operable to produce a variety of sounds (e.g., buzzes, beeps, clicks) and/or frequencies (e.g., tones), and to operate at different volumes. It is contemplated that visual indicator 200 would be the preferred indicator device, with an audio indicator 210 contemplated to be employed, if at all, in conjunction with a visual indicator 200, such as might prove useful to the visually impaired. The invention is not limited to any particular sort of display or signal by the tag 70. The foregoing indicator devices 200, 210 are readily commercially available and will not be illustrated or described in detail herein. The source of power for such indicator devices 200, 210 can be a small power cell incorporated into the device 200,210 or ambient energy received via the antenna 74 on the RFID tag 70, or energy from an interrogation signal sent form a remote reader 84.

It is contemplated that the users and operators of data storage subsystems 10 may utilize the functionality of the present invention to obtain information regarding the components in the data storage subsystem 10 and to utilize such information in assessing status of the system 10; streamlining service calls on the system 10; performing maintenance checks on the system 10; augmenting inventory control; verifying HDD compatibility for both capacity and RPM; etc. For example, a service technician may wish to obtain information regarding which hard disk drives 50 in the subsystem 10 were manufactured prior to some certain date such that proactive replacement of such drives might warranted. The types of information that would be useful to store on the memory device 70 in memory 80 in regard to the data storage subsystem component 50 are not limited to any particular type of information, such that the examples noted herein are merely for purposes of illustration.

It is noted that the performance of steps in the practice of the invention may be performed as part of a service engagement. For example, a consulting business may have service responsibility for the data storage subsystem 10. Such service responsibility may include such tasks as system upgrades, error diagnostic, performance tuning and enhancement, installation of new hardware, installation of new software, configuration with other systems, and the like. As part of this service, or as a separate service, the service provider may employ the invention in order to accomplish some or all of the foregoing tasks. For these reasons, the steps depicted in FIG. 9 (described below) are indicated as being accomplished by a "service provider," although the invention is not so limited and may be accomplished by a user or operator of the system 10 or any delegate or agent thereof. It is noted that the steps depicted in FIG. 9 can be performed in other orders, and that the series of steps depicted are for illustrative purposes only.

Figure 9:
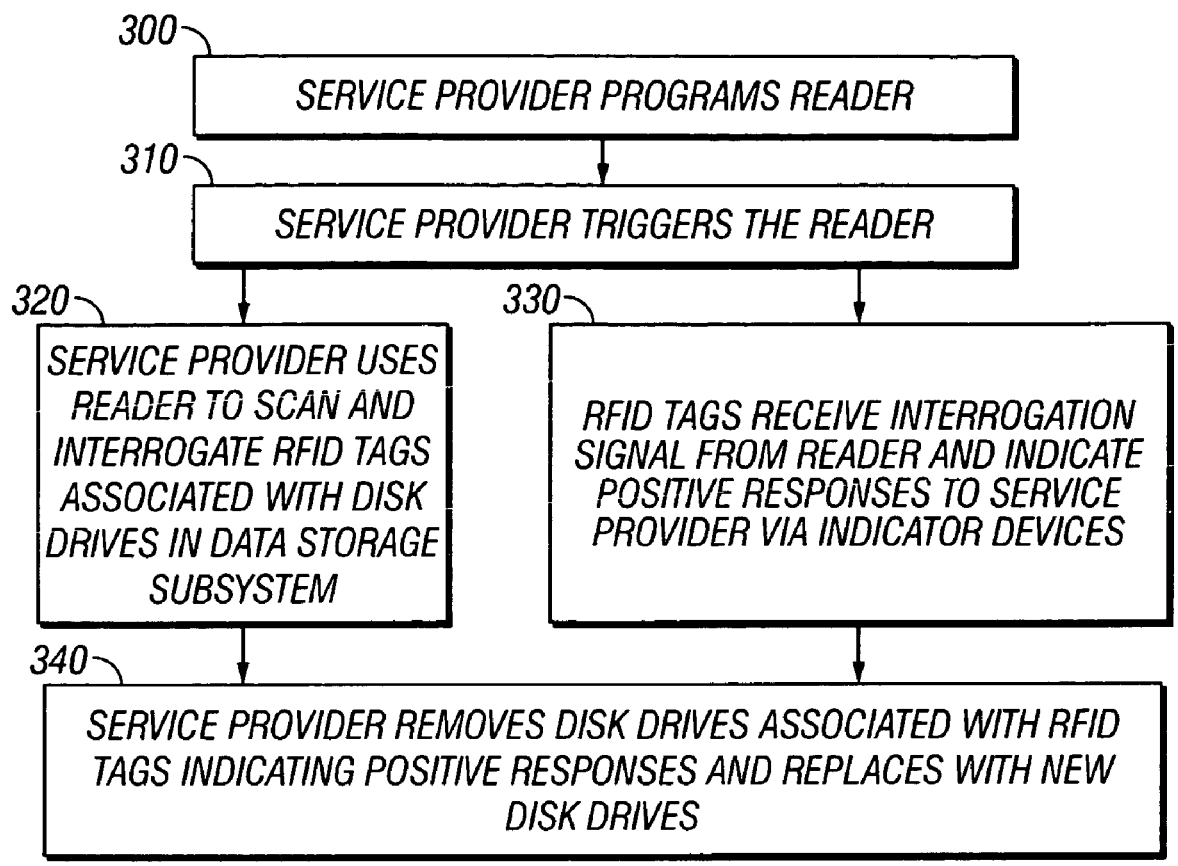
FIG. 9 is a flow chart indicating steps taken in one embodiment of the invention for obtaining information regarding component in a data storage subsystem.

Turning to FIG. 9, therein is depicted an exemplary series of steps that a service provider in regard to data storage subsystem 10 might employ in the practice of the invention. In Step 300, the service provider programs to reader 84 to conduct an interrogation of the memory devices 70 associated with data storage subsystem components 50 that are part of the subsystem 10. An example interrogation might to designed to determine which hard disk drives 50 in the system 10 were manufactured before a select date, such that the service provider would then replace all such identified disk drives. Continuing to Step 310, the service provider triggers the reader 84 to issue the interrogation signal 86. In Step 320, the service provider scans the memory devices 70 of interest in subsystem 10. In Step 330, memory devices 70 receive the interrogating signal 86 and respond to the signal 86 with signal 88. In regard to the example inquiry of determining which hard disk drives 50 were manufactured prior to a select date, and in a preferred embodiment, if a memory device contains information in its memory 80 that would deem a positive response to the inquiry, such memory device 70 would indicate the positive response by transmitting appropriate signals to associated visual indicator device 200 and thereby activating device 200, e.g., turn on the indicator light. Thus, the service provider would be enabled to discern, by simply observing the responses of the indicator devices 200, which drives 50 should be replaced in subsystem 10. In Step 340, the service provider might then choose to act on the information received in the interrogation, and in this example, would remove the indicated disk drives 50 and replace such drives with newer drives. Without the invention, the service provider might have to resort to checking the bar codes of each drive 50 against a database in a multi-step, tedious process.

In another embodiment of the invention, the reader 84 could be programmed with specific information identifying certain components that an operator/service provider wishes to locate. In such case, the unique identifier for each desired data storage subsystem component 50 would be stored in the reserved memory location in the handheld reader. As the identifier of, for example, disk drive devices 50 were read by the reader 84, each would be compared, using standard software routines known to those skilled in the art, with the list of items stored in memory. When a match occurred, the indicator device 200 and/or 210 associated with the drive 50 would create one or more visual, audio or other signals indicating the presence of the component. One application for this function includes locating items that are believed to be missing. Another application for this function is for an operator to identify, for example, which disk drives 50 are near end of life, requiring likely impending replacement or maintenance.

While the preferred embodiments of the present invention have been illustrated in detail, the skilled artisan will appreciate that modifications and adaptations to those embodiments may be made without departing from the scope of the present invention as set forth in the following claims.

What is claimed is:

1. A data storage subsystem, comprising:
a data storage subsystem including a data storage device;
a memory device associated with said data storage device, said memory device storing information
an indicator device coupled to said memory device configured to selectively indicate said information;
wherein said information comprises:
Serial number data;
Model number data;
Expected life of the storage device;
Information regarding most recent service and maintenance regarding said data storage device; and
Date of manufacture data.

2. The data storage subsystem of claim 1 wherein said memory device is configured to transmit said information upon wireless interrogation.

3. The data storage subsystem of claim 1 wherein said memory device prevents operation of said data storage device unless that data storage device is properly connected to said data storage subsystem.

4. The data storage subsystem of claim 3 wherein said memory device initiates an alarm indicator upon unauthorized removal of said data storage device.

5. The data storage subsystem of claim 3 wherein said data storage device is selected from the group consisting of a hard disk drive, a magnetic tape drive, and an optical disk drive.

6. The data storage subsystem of claim 5 wherein:
said data storage device comprises a carrier; and
said memory device is affixed to said data storage device carrier.

7. The data storage subsystem of claim 5 wherein said memory device comprises a RFID tag.

8. The data storage subsystem of claim 7 wherein said RFID tag comprises a battery.

9. The data storage subsystem of claim 1 further comprising a reader capable of interrogating said memory device.

10. The data storage subsystem of claim 1 wherein said indicator device comprises a display device.

11. The data storage subsystem of claim 10 wherein said indicator device is selected from the group consisting of an LED display device and an LCD display device.

12. A method for tracking and displaying information regarding components of a data storage subsystem, said data storage subsystem comprising a plurality of data storage devices, said method comprising:
Affixing a memory device to a data storage device, said memory device storing information regarding said data storage device;
Coupling said memory device to an indicator device; and
Enabling said indicator device to selectively indicate said information wherein said information comprises:
Serial number data;
Model number data;
Expected life of the storage device;
Information regarding most recent service and maintenance regarding said data storage device; and
Date of manufacture data.

13. The method of claim 12 wherein said memory device is configured to transmit said information upon wireless interrogation.

14. The method of claim 12 wherein said memory device prevents operation of said data storage device unless that data storage device is properly connected to said data storage subsystem.

15. The method of claim 12 wherein said at least one data storage component comprises a data storage device.

16. The method of claim 15 wherein said memory device initiates an alarm indicator upon unauthorized removal of said data storage device.

17. The method of claim 15 wherein a memory device is affixed to each of a plurality of data storage devices.

18. The method of claim 13 wherein said memory device comprises a RFID tag.

19. The method of claim 13 wherein said RFID tag comprises a battery.

20. The method of claim 12 wherein said indicator device is enabled to selectively indicate said information.

21. A method of obtaining information regarding components in a data storage subsystem, said data storage subsystem including a plurality of data storage devices, each said data storage device having associated therewith a memory device, said memory device storing information regarding said associated data storage component and configured to transmit said information upon interrogation, said memory device coupled to an indicator device configured to selectively indicate said information, said method comprising the following steps:
Providing a reader capable of interrogating said memory device;
Sending, via said reader, an interrogation to each said memory device to obtain information regarding each said associated data storage component; and
Observing said indicator devices to ascertain said information for each said associated data storage component;
wherein said information comprises:
Serial number data;
Model number data;
Expected life of the data storage device;
Information regarding most recent service and maintenance regarding said data storage device; and
Date of manufacture data.

22. The method of claim 21 wherein said memory device is configured to transmit said information upon wireless interrogation.

23. The method of claim 21 wherein said step of sending, via said reader, an interrogation to each said memory device to obtain information regarding each said associated data storage device is accomplished substantially simultaneously for each said memory device.

24. The method of claim 21 wherein said wherein said memory device prevents operation of said data storage device unless that data storage device is properly connected to said data storage subsystem.

25. The method of claim 21 wherein said memory device initiates an alarm indicator upon unauthorized removal of said data storage device.

26. The method of claim 25 wherein said at least one data storage device is selected from the group consisting of a hard disk drive, a magnetic tape drive, and an optical disk drive.

27. The method of claim 22 wherein said memory device comprises a RFID tag.

28. The method of claim 22 wherein said RFID tag comprises a battery.

29. The method of claim 27 further comprising the step of writing an update to the information stored in said RFID tag.

30. The method of claim 21 wherein said indicator device is a display device.

31. The method of claim 30 wherein said indicator device is selected from the group consisting of an LED display device and an LCD display device.

32. The method of claim 21 wherein said indicator devices indicate said information by an audible sound.

* * * * *